United States Patent
Kakizaki et al.

(10) Patent No.: US 6,847,670 B1
(45) Date of Patent: *Jan. 25, 2005

(54) GAS LASER APPARATUS EMITTING ULTRAVIOLET RADIATION

(75) Inventors: Koji Kakizaki, Gotenba (JP); Takashi Saito, Gotenba (JP); Hidenori Watanabe, Gotenba (JP)

(73) Assignee: Ushio Denki Kabushiki Kaisya, Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 09/661,481

(22) Filed: Sep. 14, 2000

(30) Foreign Application Priority Data

Sep. 16, 1999 (JP) .............................. 11-261628
Jan. 31, 2000 (JP) ........................................ 2000-021581

(51) Int. Cl.[7] ............................ H01S 3/22; H01S 3/223
(52) U.S. Cl. ................... 372/57; 372/38.02; 372/38.03; 372/38.07; 372/82
(58) Field of Search ..................... 372/25, 37, 38.02, 372/38.07, 57, 82, 38.03

(56) References Cited

U.S. PATENT DOCUMENTS

| | | | | |
|---|---|---|---|---|
| 4,837,773 A | * | 6/1989 | Wakata et al. ................. | 372/86 |
| 5,251,226 A | * | 10/1993 | Watanabe et al. ............. | 372/87 |
| 5,639,566 A | * | 6/1997 | Okamura et al. ............. | 428/692 |
| 5,754,579 A | * | 5/1998 | Mizoguchi et al. ............ | 372/58 |
| 5,940,421 A | * | 8/1999 | Partlo et al. .................. | 372/38 |
| 6,018,537 A | * | 1/2000 | Hofmann et al. .............. | 372/25 |
| 6,184,662 B1 | * | 2/2001 | Yabuuchi et al. ........... | 323/222 |
| 6,188,144 B1 | * | 2/2001 | Kawasuji ..................... | 307/108 |
| 6,198,646 B1 | * | 3/2001 | Barrett ........................ | 363/96 |
| 6,226,307 B1 | * | 5/2001 | Desor et al. .................. | 372/37 |
| 6,389,049 B2 | * | 5/2002 | Yoshida et al. .......... | 372/38.02 |
| 6,636,546 B2 | * | 10/2003 | Kakizaki et al. .............. | 372/57 |
| 6,643,312 B2 | * | 11/2003 | Kakizaki et al. .............. | 372/57 |

FOREIGN PATENT DOCUMENTS

| | | |
|---|---|---|
| JP | 62-2683 | 1/1987 |
| JP | 63-110780 | 5/1988 |

OTHER PUBLICATIONS

Mituo Maeda, "Excimer Laser", Aug. 20, 1993, pp. 62–65 and end page.

* cited by examiner

Primary Examiner—David Porta
Assistant Examiner—Davienne Monbleau
(74) Attorney, Agent, or Firm—Dellett & Walters

(57) ABSTRACT

The oscillation pulse width is extended in a gas laser apparatus emitting ultraviolet radiation by a high-repetition rate oscillating operation. The gas laser apparatus has a pair of laser discharge electrodes connected to the output terminals of a magnetic pulse compression circuit and disposed in a laser chamber. The pulse width is extended by determining circuit constants so that the period of the oscillating current flowing between the discharge electrodes is shortened and, at the same time, the peak value of the current is increased, whereby the laser gas is continuously excited even during at least one half-cycle subsequent to the first half-cycle of the oscillating current to sustain the laser oscillating operation.

3 Claims, 8 Drawing Sheets

GAS LASER APPARATUS EMITTING ULTRAVIOLET RADIATION

BACKGROUND OF THE INVENTION

The present invention relates to gas laser apparatus emitting ultraviolet radiation. More particularly, the present invention relates to gas laser apparatus, i.e. KrF excimer laser, ArF excimer laser, and fluorine laser, which perform a lasing operation with an extended oscillation pulse width.

With the achievement of small, fine and high-integration semiconductor integrated circuits, it has been demanded that projection exposure systems for the manufacture of such highly integrated circuits be improved in resolution. Under these circumstances, the wavelength of exposure light emitted from light sources for lithography is becoming shorter, and gas laser apparatus emitting ultraviolet radiation are promising as next-generation light sources for semiconductor lithography, i.e. KrF excimer laser of wavelength 248 nm, ArF excimer laser of wavelength 193 nm, and fluorine laser of wavelength 157 nm.

In these excimer laser apparatus, a laser gas is sealed in a laser chamber under several hundred kPa. That is, in the KrF excimer laser, a mixed gas of fluorine ($F_2$) gas, krypton (Kr) gas and a rare gas, e.g. neon (Ne), as a buffer gas is sealed in the laser chamber as a laser gas. In the ArF excimer laser, a mixed gas of fluorine ($F_2$) gas, argon (Ar) gas and a rare gas, e.g. neon (Ne), as a buffer gas is similarly sealed in the laser chamber as a laser gas. In the $F_2$ laser, a mixed gas of fluorine ($F_2$) gas and a rare gas, e.g. helium (He) or/and neon (Ne), as a buffer gas is similarly sealed in the laser chamber as a laser gas. In these apparatus, the laser gas as a laser medium is excited by generating an electric discharge in the laser chamber.

In these gas laser apparatus, the oscillation pulse width ($T_{is}$) is about 20 ns at maximum. Therefore, the peak power of the output light is large. In addition, because the wavelength of the output light is short, the photon energy is high. Accordingly, the probability of occurrence of two-photon absorption is higher than in the case of mercury lamps, which are conventional light sources for lithography. For this reason, the optical elements of the projection exposure system may be damaged by a compaction (an increase in refractive index), etc., causing the performance of the projection exposure system to be degraded. The oscillation pulse width ($T_{is}$) is defined by $$T_{is} = [\int P(t)dt]^2 / \int P^2(t)dt$$

where P(t) is the laser intensity depending upon time t.

To avoid the above-described problem, therefore, it is demanded that the oscillation pulse width be extended (i.e. a longer pulse width should be achieved) without a change in energy per pulse, thereby reducing the peak power of the output light. For example, a pulse width of 30 ns or longer is demanded.

There has heretofore been no particular proposition concerning an exciting circuit for realizing a longer pulse width in the above-described gas laser apparatus. However, there have been some propositions regarding the achievement of a longer pulse width in an excimer laser apparatus having a laser medium different from those mentioned above.

It is generally known that the discharge current flowing between the main discharge electrodes of an excimer laser apparatus is an oscillating current, and as shown in the waveform chart of FIG. 8, the first half-cycle of the oscillating current contributes to the laser oscillation [see "Excimer Laser" (first edition), edited by Mitsuo Maeda, p. 64, Japan Scientific Societies Press, Aug. 20, 1983].

The conventional technique intends to extend the pulse width of the above-described first half-cycle for the purpose of achieving a longer pulse width. For example, Japanese Patent Application Unexamined Publication (KOKAI) No. Sho 62-2683 discloses an example in which, as shown in FIG. 9, an inductance L, is added to one of the main discharge electrodes in the exciting circuit of a XeCl excimer laser. In addition, "The Review of Laser Engineering" Vol. 15, No. 7, pp. 63–72, shows an example in which a PFN (Pulse Forming Network) is used in the exciting circuit of a XeCl excimer laser.

It is conceivable that the application of the above-described conventional technique to the KrF excimer laser, ArF excimer laser and fluorine laser also allows realization of a longer pulse width of pulsed laser light emitted from the laser apparatus.

From the viewpoint of improving the throughput of lithographic processing for the manufacture of semiconductor devices, it has recently been demanded that excimer laser apparatus for lithography perform a high-repetition rate oscillating operation, i.e. 2 kHz or more. If it is intended to realize a longer pulse width in such a high-repetition rate oscillating operation with the conventional technique wherein an inductance is added to the main discharge circuit as shown in FIG. 9, the laser oscillating efficiency becomes extremely low. It is actually difficult with the conventional technique to realize a longer pulse width in the demanded high-repetition rate oscillating operation.

SUMMARY OF THE INVENTION

In view of the above-described problems with the prior art, an object of the present invention is to extend the oscillation pulse width in gas laser apparatus emitting ultraviolet radiation, e.g. KrF excimer laser, ArF excimer laser and fluorine laser, which perform a high-repetition rate oscillating operation.

To attain the above-described object, the present invention provides a gas laser apparatus emitting ultraviolet radiation that has a pair of laser discharge electrodes connected to output terminals of a magnetic pulse compression circuit and disposed in a laser chamber. The gas laser apparatus performs a laser oscillating operation by the first half-cycle of the discharge oscillating current waveform of one pulse in which the polarity is reversed, together with at least one half-cycle subsequent to the first half-cycle.

When the gas laser apparatus emitting ultraviolet radiation is an ArF excimer laser, the magnetic pulse compression circuit has a series circuit including a first magnetic switch and a first capacitor. A second capacitor is connected to both ends of the series circuit. A second magnetic switch is connected at one end thereof to the junction between the first magnetic switch and the second capacitor. The other end of the second magnetic switch and the other end of the second capacitor constitute the above-described output terminals. When the capacitance of the second capacitor is 12 to 16 nF, and the capacitance of a peaking capacitor of the laser apparatus that is connected between the output terminals in parallel to the pair of laser discharge electrodes is 10 to 16 nF, and further the inductance of a circuit loop formed by the peaking capacitor and the pair of laser discharge electrodes is 5 to 8 nH, and further the distance between the pair of laser discharge electrodes is 15 to 20 mm, and further the partial pressure of fluorine in the laser chamber is less than 0.12% of the total pressure of the laser gas, the rise time required for a voltage applied between the pair of laser discharge electrodes to reach a voltage at which breakdown occurs is not more than 80 ns.

It is desirable that the voltage at which breakdown occurs between the pair of laser discharge electrodes be from 18 to 28 kV, and that the rise time of the voltage be not less than 40 ns.

Thus, it is possible to realize KrF excimer laser apparatus, ArF excimer laser apparatus and fluorine laser apparatus, which perform a high-repetition rate and extended-pulse width oscillating operation in which the repetition frequency is 2 kHz or more and the oscillation pulse width is 30 ns or more by arranging the apparatus so that a laser oscillating operation is performed by the first half-cycle of the discharge oscillating current waveform of one pulse in which the polarity is reversed together with at least one half-pulse, preferably two half-pulses, subsequent to the first half-cycle.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The principle of the present invention, together with an embodiment thereof, will be described below with reference to the accompanying drawings.

The present inventors have succeeded in realizing a high-repetition rate and extended-pulse width oscillating operation of an ArF excimer laser apparatus by adopting an approach entirely different from those in the prior art. First, the principle of the present invention will be described below.

As a result of exhaustive studies, the present inventors have found that it is possible to realize a longer pulse width by determining circuit constants so that the period of the oscillating current flowing between the discharge electrodes is shortened and, at the same time, the peak value of the current is increased.

Figure 1:
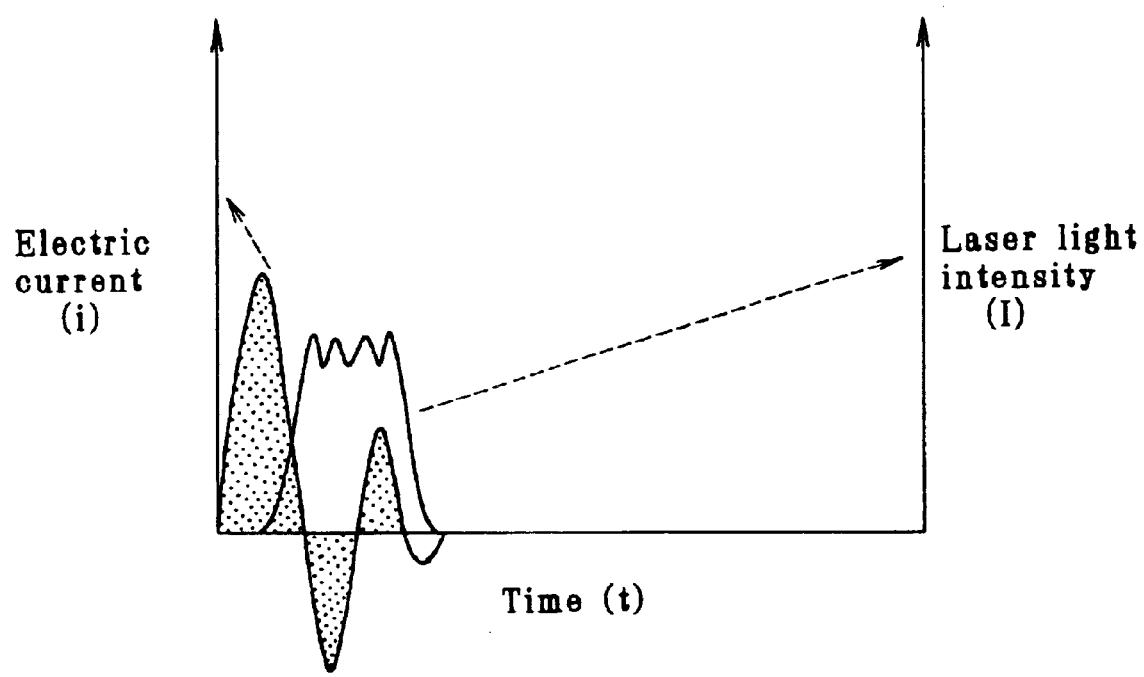
FIG. 1 is a waveform chart for describing the principle of an ArF excimer laser apparatus according to the present invention.

More specifically, it has heretofore been considered that only the first half-cycle of the oscillating current contributes to the laser oscillation, as stated above. Actually, the conventional excimer laser apparatus do not perform a laser oscillating operation during the period of time after the first half-cycle of the oscillating current. However, as shown in the waveform chart of FIG. 1, it is possible to realize a longer pulse width by determining circuit constants so that the period of the oscillating current flowing between the discharge electrodes is shortened and, at the same time, the peak value of the current is increased (a specific circuit configuration and specific circuit constants will be described later), whereby the laser gas is continuously excited even during at least one half-cycle subsequent to the first half-cycle of the oscillating current to sustain the laser oscillating operation.

A specific example of an ArF excimer laser apparatus according to the present invention, together with a specific example of an exciting circuit thereof, will be shown below.

Figure 2:
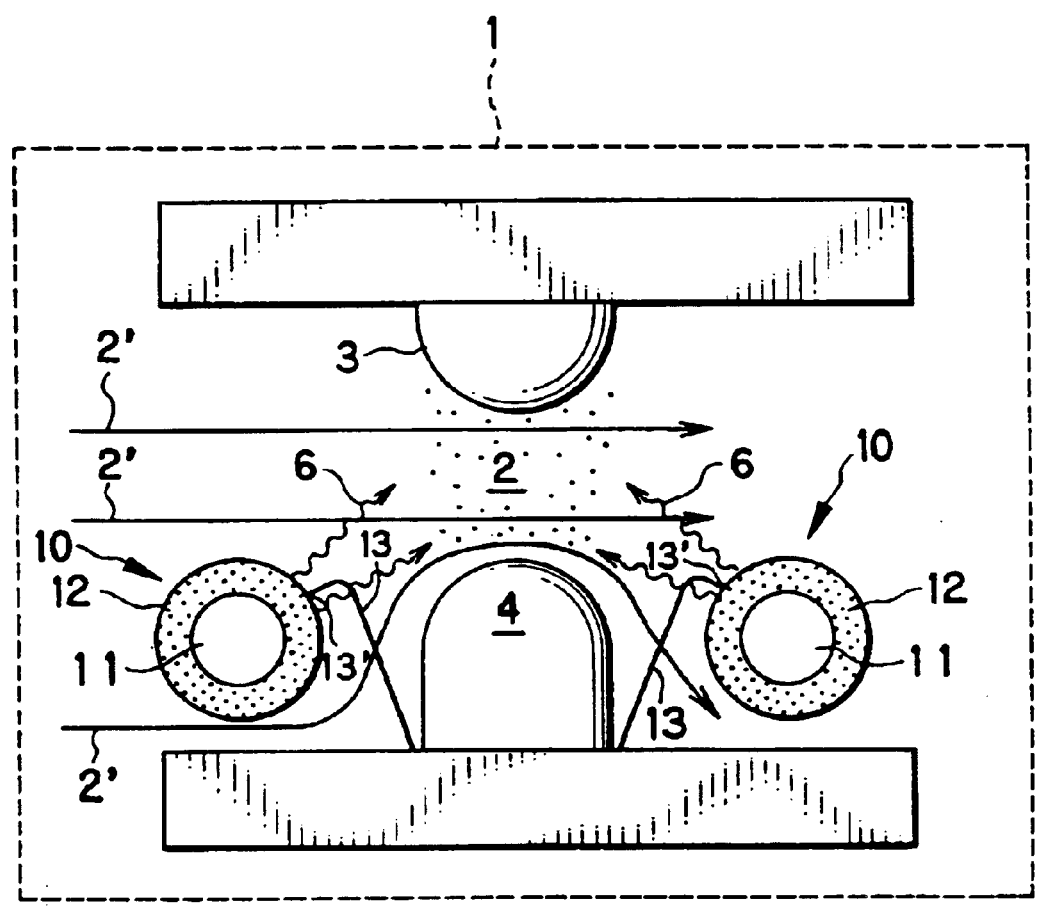
FIG. 2 is a sectional view in a direction perpendicular to the laser oscillation direction of an example of ArF excimer laser apparatus to which the present invention is applied.

FIG. 2 is a sectional view in a direction perpendicular to the laser oscillation direction of an ArF excimer laser apparatus to which the present invention is applied. A laser cavity 1 is filled with a laser gas 2 (a mixed gas of Ar gas, $F_2$ gas and Ne gas). Main discharge electrodes 3 and 4 for exciting the laser gas 2 are disposed to face each other in a direction perpendicular to the laser oscillation direction. The laser gas 2 is circulated by a fan (not shown) so as to form a gas stream 2' between the opposed main discharge electrodes 3 and 4. Corona preionization electrode units 10 are disposed on the upstream and downstream sides, respectively, of the stream 2' of laser gas 2 in parallel to one main discharge electrode 4. The corona preionization electrode units 10 perform a corona discharge operation immediately before the application of a pulse voltage between the main discharge electrodes 3 and 4 to generate a main electric discharge, thereby irradiating the laser gas 2 between the main discharge electrodes 3 and 4 with ultraviolet radiation 6 and thus weakly ionizing the laser gas 2 to promote excitation by the main discharge electrodes 3 and 4.

In this example, each corona preionization electrode unit 10 includes a first electrode 11 and a second electrode 13. The first electrode 11 is a circular column-shaped electrode inserted into a tube 12, one end of which is closed. The tube 12 is made of a dielectric material, e.g. high-purity alumina ceramics. The second electrode 13 is a rectangular plate-shaped electrode. The plate-shaped member constituting the second electrode 13 is bent in the vicinity of a straight edge 13' thereof. The edge 13' of the second electrode 13 is parallel to and in line contact with the outer surface of the dielectric tube 12. The second electrode 13 has a plurality of openings provided in a portion of the rectangular plate-shaped member other than at least the edge 13'. The position at which the edge 13' of the second electrode 13 contacts the outer surface of the dielectric tube 12 around the first electrode 11 is set at a position from which the laser excitation space between the main discharge electrodes 3 and 4 is visible.

Figure 3:
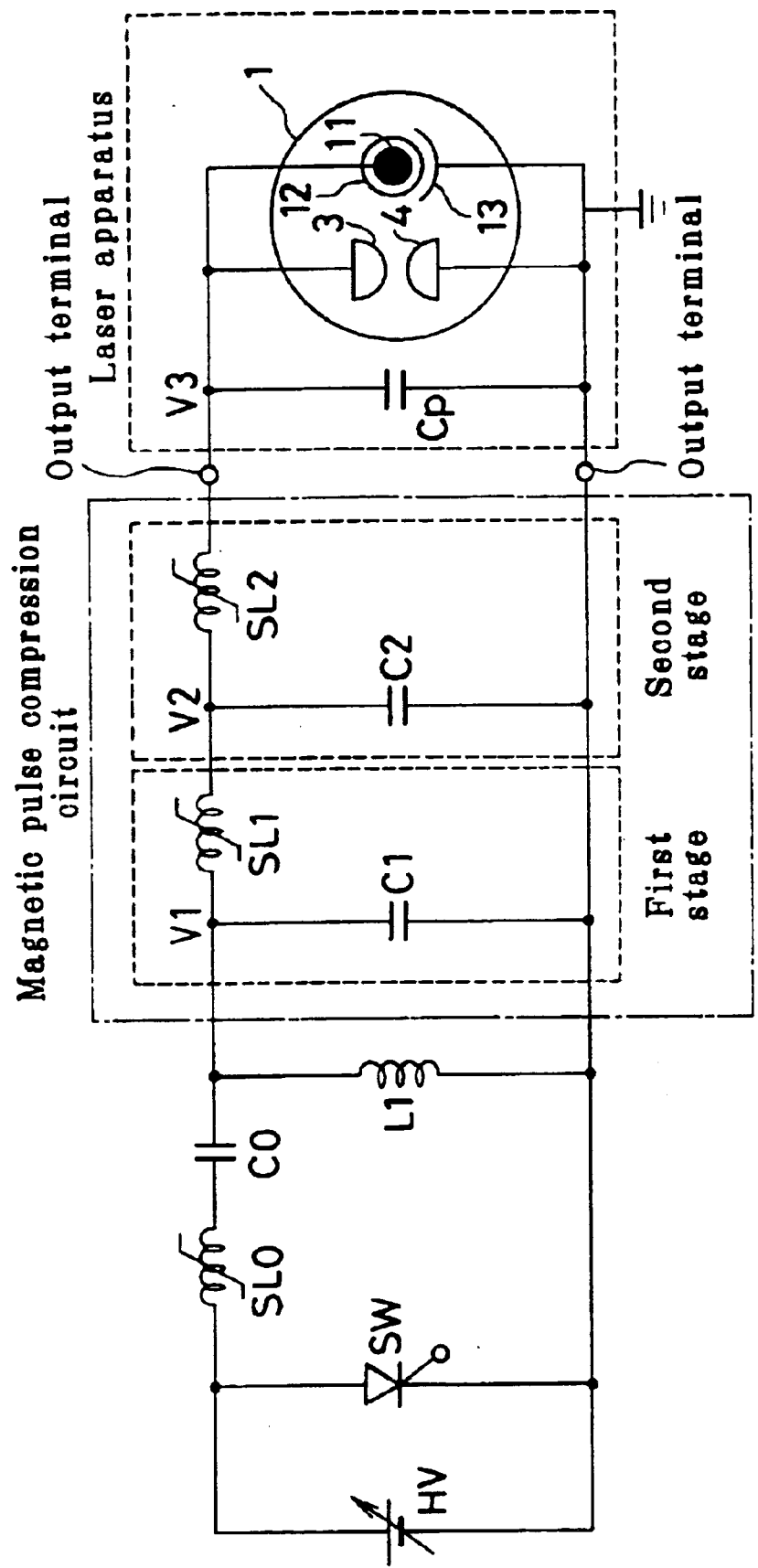
FIG. 3 is a circuit diagram showing an example of an exciting circuit according to the present invention.

An exciting circuit arranged as shown in FIG. 3 applies a main discharge voltage between the main discharge electrodes 3 and 4 of the ArF excimer laser apparatus and also applies a predischarge voltage between the electrodes 11 and 13 of each corona preionization electrode unit 10.

The exciting circuit shown in FIG. 3 is a two-stage magnetic pulse compression circuit using three magnetic switches SL0, SL1 and SL2 formed from saturable reactors, respectively. The magnetic switch SL0 protects a solid-state switch SW. The first magnetic switch SL1 and the second magnetic switch SL2 constitute a two-stage magnetic pulse compression circuit.

The arrangement and operation of the circuit will be described below with reference to FIG. 3. First, the voltage of a high-voltage power source HV is adjusted to a predetermined value, and a main capacitor C0 is charged through the magnetic switch SL0 and an inductance L1. At this time, the solid-state switch SW is OFF. Upon completion of the charging of the main capacitor C0, the solid-state switch SW turns ON. At this time, the voltage across the solid-state switch SW shifts so as to be applied across the magnetic switch SL0, thereby protecting the solid-state switch SW. When the time integration value of the charging voltage V0 across the main capacitor C0, which is applied across the magnetic switch SL0, reaches a critical value determined by the characteristics of the magnetic switch SL0, the magnetic switch SL0 is saturated to turn ON. Consequently, an electric current flows through a loop formed by the main capacitor C0, the magnetic switch SL0, the solid-state switch SW and a capacitor C1. As a result, the electric charge stored in the main capacitor C0 is transferred to and stored in the capacitor C1.

Thereafter, when the time integration value of the voltage V1 across the capacitor C1 reaches a critical value determined by the characteristics of the magnetic switch SL1, the magnetic switch SL1 is saturated to turn ON. Consequently, an electric current flows through a loop formed by the capacitor C1, a capacitor C2 and the magnetic switch SL2. As a result, the electric charge stored in the capacitor C1 is transferred to and stored in the capacitor C2.

Thereafter, when the time integration value of the voltage V2 across the capacitor C2 reaches a critical value determined by the characteristics of the magnetic switch SL2, the magnetic switch SL2 is saturated to turn ON. Consequently, an electric current flows through a loop formed by the capacitor C2, a peaking capacitor Cp and the magnetic switch SL2. As a result, the electric charge stored in the capacitor C2 is transferred to and stored in the peaking capacitor Cp.

As will be clear from the description given in connection with FIG. 2, a corona discharge for preionization occurs at the outer peripheral surface of the dielectric tube 12, starting from the position at which the second electrode 13 contacts the dielectric tube 12. More specifically, as the charging of the peaking capacitor Cp, which is shown in FIG. 3, proceeds, the voltage V3 across the peaking capacitor Cp increases. When the voltage V3 reaches a predetermined value, a corona discharge occurs at the surface of the dielectric tube 12 of each corona preionization electrode unit 10. The corona discharge causes ultraviolet radiation 6 to be generated at the surface of the dielectric tube 12. The ultraviolet radiation 6 preionizes the laser gas 2 flowing between the main discharge electrodes 3 and 4 as a laser medium.

As the charging of the peaking capacitor Cp further proceeds, the voltage V3 across the peaking capacitor Cp increases. When the voltage V3 reaches a certain value (breakdown voltage) Vb, a dielectric breakdown occurs in the laser gas 2 between the main discharge electrodes 3 and 4, and thus a main discharge starts. The laser medium is excited by the main discharge, and laser light is generated.

As a result of the main discharge, the voltage across the peaking capacitor Cp lowers rapidly and eventually returns to the state before the start of charging.

The above-described discharging operation is repeated by the switching operation of the solid-state switch SW, whereby pulsed laser oscillation is performed at a predetermined repetition frequency.

Thus, a combination of the magnetic switch SL1 and the capacitor C1 forms a capacitive transfer circuit constituting a first stage, and a combination of the magnetic switch SL2 and the capacitor C2 forms a capacitive transfer circuit constituting a second stage. By setting the inductance of each capacitive transfer circuit so that the inductance becomes smaller as the ordinal number of stages increases, a pulse compression operation is carried out such that the pulse width of an electric current pulse flowing through each stage narrows successively. Consequently, a strong discharge of short pulse is realized between the main discharge electrodes 3 and 4.

Figure 4:
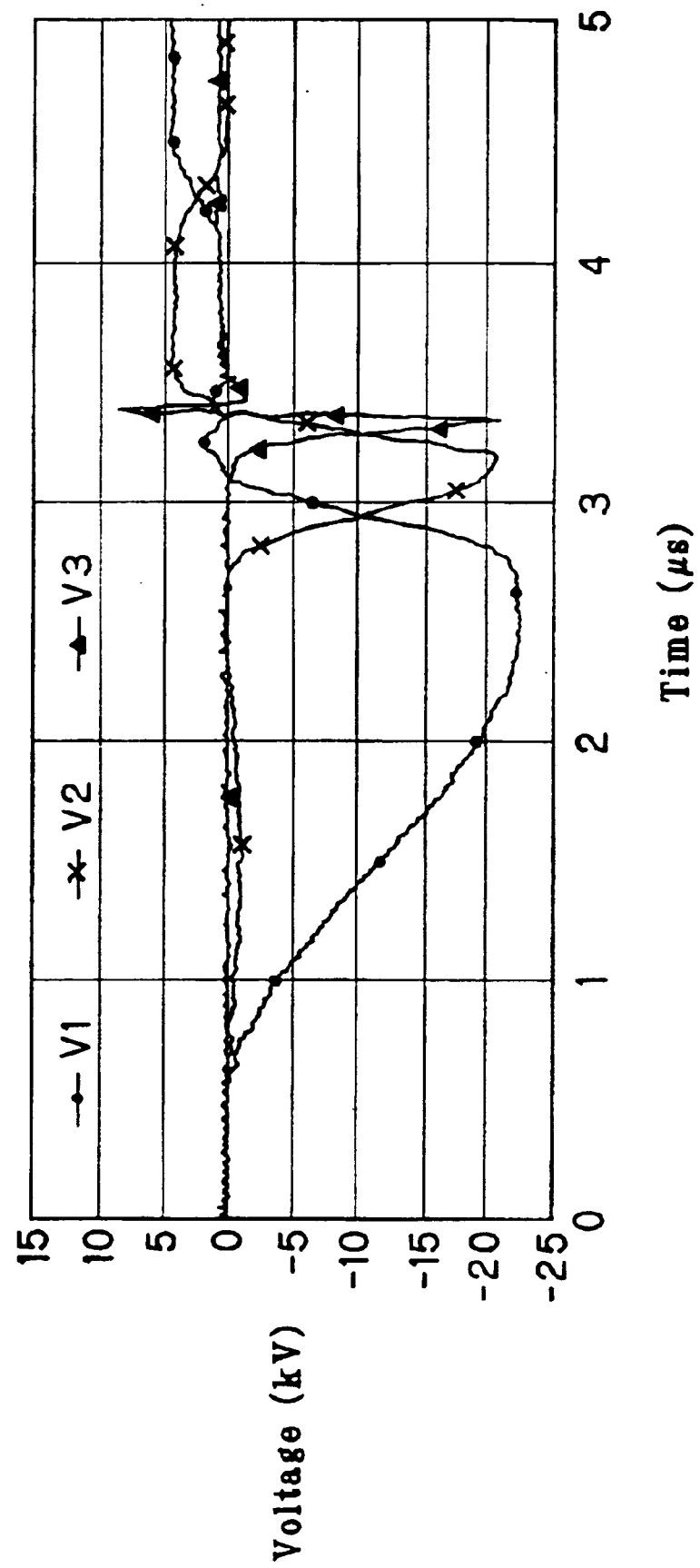
FIG. 4 is a diagram showing an example of a voltage waveform occurring at each capacitor position of the exciting circuit shown in FIG. 3.

FIG. 4 shows an example of a voltage waveform occurring at each capacitor position of the above-described exciting circuit, i.e. at the capacitors C1 and C2 and the peaking capacitor Cp. FIG. 4 clearly shows the way in which the pulse width is compressed successively.

Incidentally, when the ArF excimer laser apparatus is used as a light source for semiconductor lithography, a discharge volume necessary for lithography is naturally determined by the laser output energy necessary for lithography. In view of the discharge voltage, the distance between the main discharge electrodes 3 and 4 needs to be about 15 to 20 mm. Because the laser output energy is determined by the capacitance of the peaking capacitor Cp, when the ArF excimer laser apparatus is used as a light source for semiconductor lithography, the capacitance of the peaking capacitor Cp needs to be 10 to 16 nF.

As has been stated above, in order to allow laser oscillation to continue even during the period of time after the first half-cycle of the oscillating current flowing between the main discharge electrodes 3 and 4 on the basis of the present invention, it is necessary to determine circuit constants so that the peak value of the electric current is increased. The voltage (breakdown voltage) Vb at which an electric discharge starts between the main discharge electrodes 3 and 4 depends on the rise of the voltage applied between the main discharge electrodes 3 and 4. When the rise time is short, the discharge starting voltage Vb becomes high (occurrence of an overvoltage). Therefore, in order to increase the peak value of the electric current, it is necessary to make the applied voltage increase sharply. The larger the capacitance of the capacitor C2 with respect to that of the peaking capacitor Cp, the sharper the rise of the voltage. Accordingly, it is desirable to increase the capacitance of the capacitor C2. However, as the capacitance of the capacitor C2 is increased, the amount of energy required to drive the whole laser apparatus increases. As a result, the efficiency of the laser apparatus reduces unfavorably. Therefore, there is a limit to the increase in capacitance of the capacitor C2. When the ArF excimer laser apparatus is used as a light source for semiconductor lithography, the capacitance of the capacitor C2 is set at 12 to 16 nF.

In addition, it is necessary to reduce the electric resistance of the laser gas 2 in order to increase the peak value of the electric current during the second and later half-cycles of the oscillating current flowing between the main discharge electrodes 3 and 4 so that laser oscillation is continued even during the second and later half-cycles. When the ArF excimer laser apparatus uses a laser gas consisting essentially of Ar+F$_2$+Ne at 3 to 4 atmospheric pressure, the electric resistance of the laser gas becomes lower as the partial pressure of fluorine decreases. Therefore, it is desirable that the fluorine partial pressure with respect to the total pressure of the laser gas be less than 0.12%.

As has been stated above, it is necessary in order to continue the laser oscillation even during the second and later half-cycles to shorten the period of the oscillating current flowing between the main discharge electrodes 3 and 4. If the period of the oscillating current flowing is long, spatial concentration of electric discharge occurs during the latter half of the first half-cycle. As a result, the required uniform excitation cannot be performed efficiently. Parameters that determine the period of the oscillating current flowing are the capacitance and stray inductance in the loop (discharge current circuit) formed by the peaking capacitor Cp and the main discharge electrodes 3 and 4 in the exciting circuit shown in FIG. 3. The root of the product of the capacitance and the stray inductance is proportional to the period of the oscillating current flowing. Accordingly, to shorten the period, the stray inductance in the discharge current circuit should be minimized. However, because the size of the stray inductance is determined by the sectional area of the laser cavity, the stray inductance cannot actually be reduced to a value smaller than about 5 to 8 nH.

Figure 5:
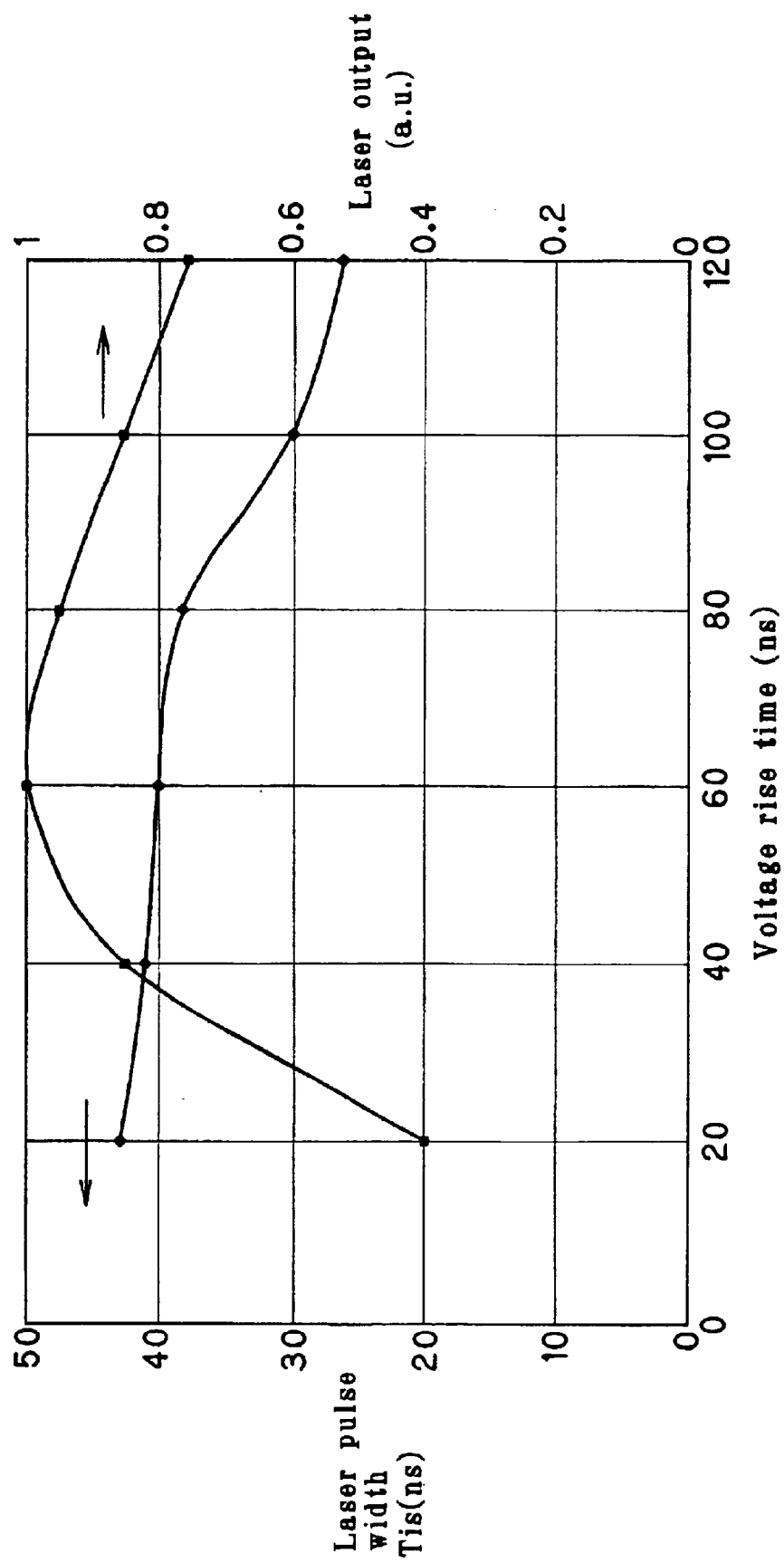
FIG. 5 is a diagram showing the results of an examination of the relationship between the laser pulse width and the laser output energy on the one hand and, on the other, the rise time required for the discharge voltage to reach a breakdown voltage.
Figure 6:
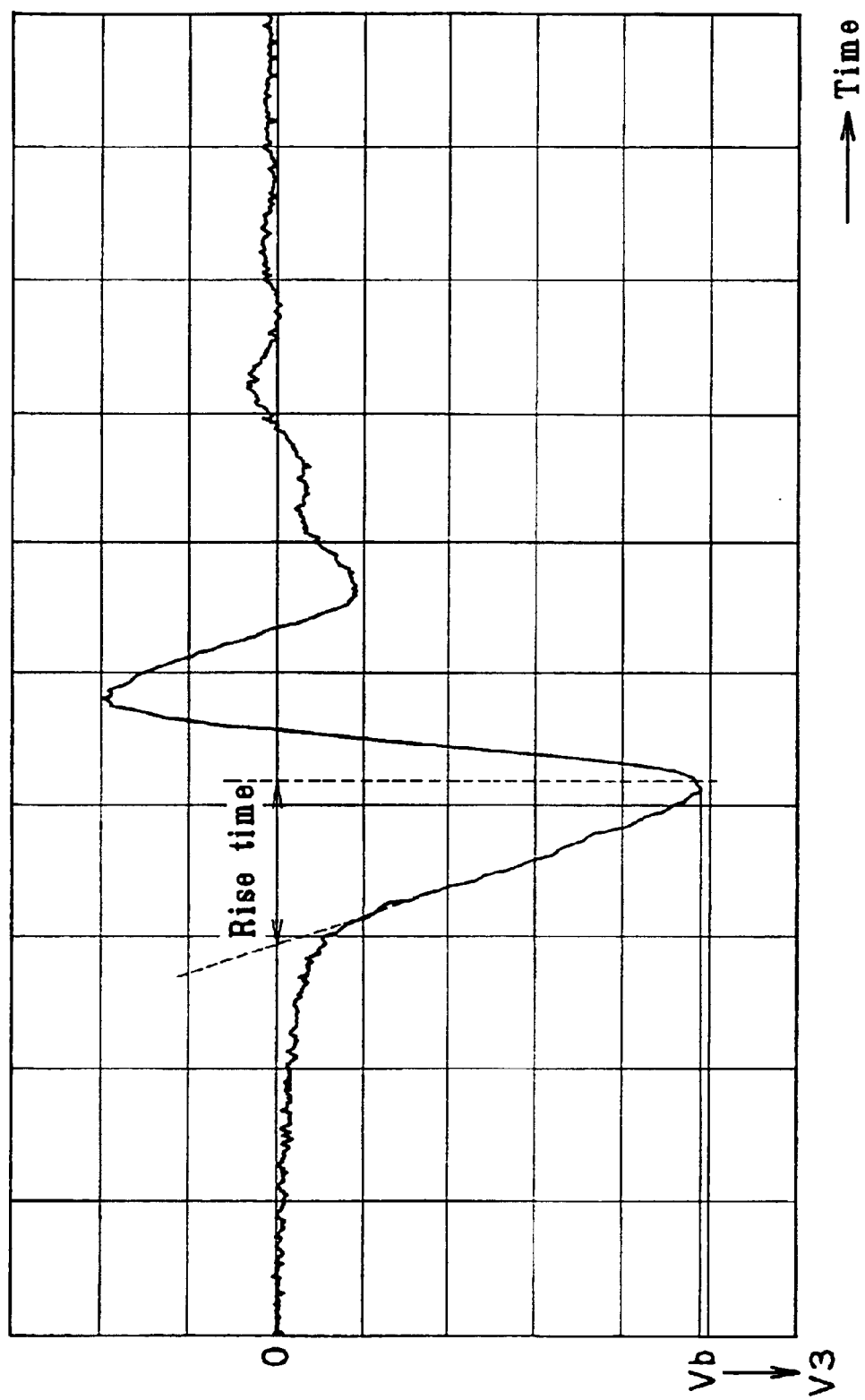
FIG. 6 is a diagram for describing the definition of the rise time.

We examined the relationship between the output laser pulse width ($T_{is}$) and the output energy on the one hand and, on the other, the rise time required for the discharge voltage to reach the breakdown voltage Vb for the discharge volume defined by the discharge width of 5 to 8 mm×the interelectrode distance of 15 to 20 mm×the length of 450 to 550 mm under the conditions where the parameters were selected in the above-described ranges. The results of the examination are shown in FIG. 5. It should be noted that the rise time required for the discharge voltage to reach the breakdown voltage Vb is defined as shown in FIG. 6. The steepest portion of the rise in the first half-cycle of the voltage V3 applied between the main discharge electrodes 3 and 4 is approximated to a straight line, and the rise time is defined as the period of time required for the straight line to reach a point at which the straight line intersects the straight line of breakdown voltage Vb from a point at which the straight line intersects the straight line of voltage 0.

As will be understood from the results shown in FIG. 5, when the rise time was less than 40 ns, the laser light output reduced, so that it was impossible to obtain the desired output. When the rise time was more than 80 ns, the pulse width of the output laser light decreased, so that it was impossible to obtain the desired pulse width.

The reason why the laser light output reduces when the rise time is less than 40 ns is considered to be due to the fact that it is impossible to ensure the period of time required for the interval between the start of corona preionization and the start of the main discharge. That is, because the rise time is excessively short, the main discharge starts undesirably before the laser gas is sufficiently preionized. Thus, the laser output reduces because of the insufficient excitation of the laser gas.

On the other hand, when the rise time is more than 80 ns, it is considered that because the rise time is excessively long, the attained value of the breakdown voltage Vb is small; therefore, laser oscillation does not take place during the second half-cycle, resulting in a shortened pulse width.

In general, when the rise time is short, the discharge starting voltage Vb becomes high (occurrence of an overvoltage), and the discharge input ($1/2 \times CpVb^2$), which is the excitation energy for the laser medium, increases. Consequently, the oscillation efficiency increases. When the rise time is more than 80 ns, it is considered that the discharge starting voltage Vb does not become high, and the electric discharge is likely to become unstable. Moreover, the discharge input is small, and the oscillation efficiency reduces. Therefore, in the current waveform shown in FIG. 1, the oscillating current cannot contribute to the laser oscillation during the period of time after the first half-cycle. Consequently, the oscillation pulse width is reduced.

In the above-described examination, the discharge starting voltage Vb required in the rise time range of from 40 ns to 80 ns was 18 to 28 kV.

It should be noted that the adjustment of the rise time was realized by adjusting the capacitance of each of the second capacitor C2 and the peaking capacitor Cp, the residual inductance in the second magnetic switch SL2 and the stray inductance in the charging current circuit of the peaking capacitor Cp.

Figure 7:
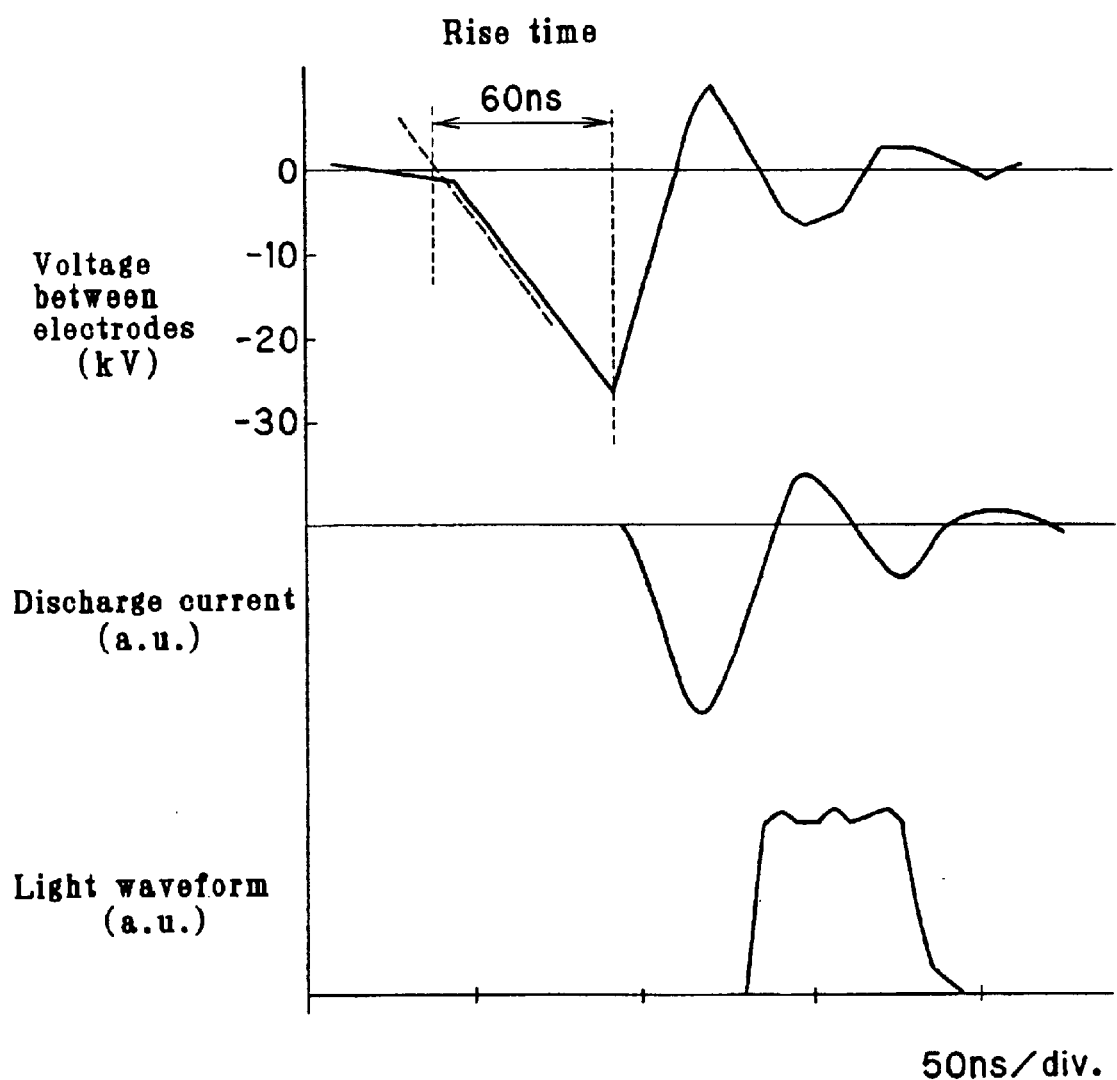
FIG. 7 is a diagram showing the voltage between discharge electrodes, the current flowing between the discharge electrodes and the laser output light waveform in an embodiment of the present invention.
Figure 8:
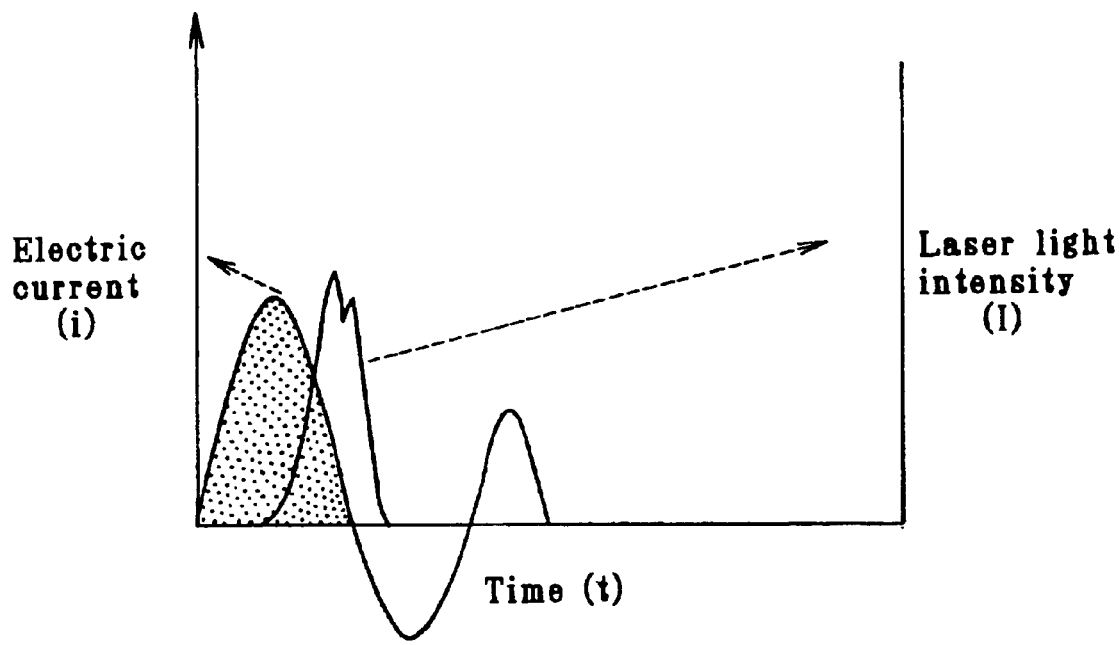
FIG. 8 is a diagram showing the discharge current and the laser light intensity in a conventional excimer laser apparatus.
Figure 9:
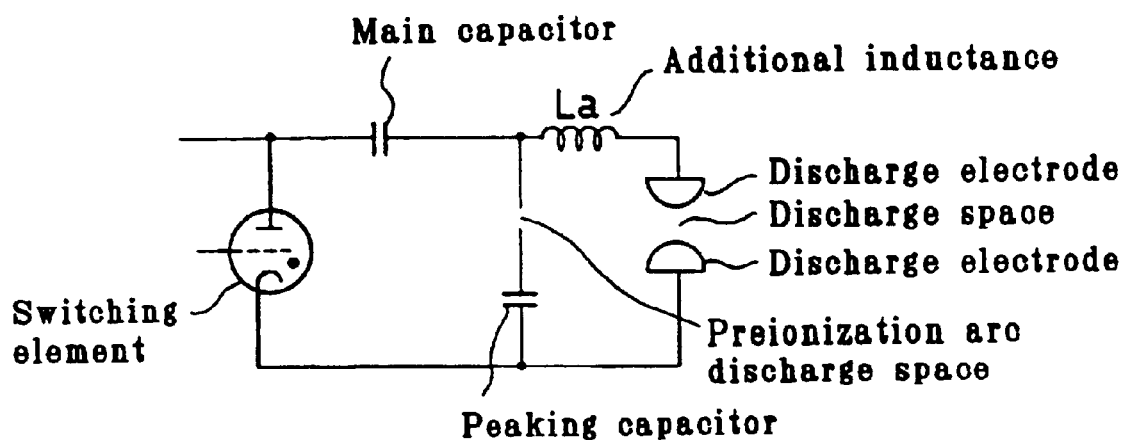
FIG. 9 is a circuit diagram showing an exciting circuit of a conventional excimer laser apparatus designed to achieve a longer pulse width.

FIG. 7 shows the voltage between the discharge electrodes, the current flowing between the discharge electrodes and the laser output light waveform in a case where: the capacitance of the second capacitor C2 was 14 nF; the capacitance of the peaking capacitor Cp was 12 nF; the stray inductance in the discharge current circuit was 6 nH; the distance between the discharge electrodes was 18 mm; the discharge starting voltage was 26 kV; the fluorine partial pressure was 0.08%; and the effective discharge length was 500 mm.

Thus, we have succeeded in realizing a high-repetition rate and extended-pulse width ArF excimer laser apparatus providing a repetition frequency of 2 kHz or more and a pulse width ($T_{is}$) of 30 ns or more by adopting the above-described arrangement based on a novel idea according to the present invention that is entirely different from the technical ideas of the prior art.

Although the present invention has been described above with regard to the ArF excimer laser apparatus, it will be clear that the above-described basic principle is also applicable to KrF excimer laser apparatus similarly effecting discharge excitation of a mixed gas as a laser gas which consists essentially of fluorine ($F_2$) gas, krypton (Kr) gas and a rare gas, e.g. neon (Ne), as a buffer gas, and also applicable to fluorine laser apparatus similarly effecting discharge excitation of a mixed gas as a laser gas which consists essentially of fluorine ($F_2$) gas and a rare gas, e.g. helium (He) and/or neon (Ne), as a buffer gas.

Although the gas laser apparatus emitting ultraviolet radiation according to the present invention has been described above on the basis of the principle and embodiments thereof, it should be noted that the present invention is not limited to the foregoing embodiments but can be modified in a variety of ways.

As will be clear from the foregoing description, the gas laser apparatus emitting ultraviolet radiation according to the present invention is arranged to perform a laser oscillating operation by the first half-cycle of the discharge oscillating current waveform of one pulse in which the polarity is reversed, together with at least one half-cycle subsequent to the first half-cycle, whereby it is possible to realize a gas laser apparatus emitting narrow-band ultraviolet radiation at a high-repetition frequency of 2 kHz or more and with an extended oscillation pulse width of 30 ns or more, which is particularly suitable for use as a light source for semiconductor lithography.

What we claim is:

1. A gas laser apparatus emitting ultraviolet radiation, comprising:

a laser chamber;

a magnetic pulse compression circuit; and a pair of laser discharge electrodes connected to output terminals of said magnetic pulse compression circuit and disposed in said laser chamber;

wherein a laser oscillating operation is performed by a first half-cycle and at least one half-cycle subsequent to the first half-cycle of a discharge oscillating current waveform of one pulse in which polarity is reversed; and wherein said discharge oscillating current flows between the discharge electrodes.

2. A gas laser apparatus emitting ultraviolet radiation according to claim 1, which is an ArF excimer laser apparatus, wherein said magnetic pulse compression circuit has:

a series circuit including a first magnetic switch and a first capacitor;

a second capacitor connected to both ends of said series circuit; and a second magnetic switch connected at one end thereof to a junction between said first magnetic switch and said second capacitor;

wherein the other end of said second magnetic switch and the other end of said second capacitor constitute said output terminals;

wherein when a capacitance of said second capacitor is 12 to 16 nF, a capacitance of a peaking capacitor of said laser apparatus that is connected between said output terminals in parallel to said pair of laser discharge electrodes is 10 to 16 nF, an inductance of a circuit loop formed by said peaking capacitor and said pair of laser discharge electrodes is 5 to 8 nH, a distance between said pair of laser discharge electrodes is 15 to 20 mm, a partial pressure of fluorine in said laser chamber is less than 0.12% of a total pressure of a laser gas; and a rise time required for a voltage applied between said pair of laser discharge electrodes to reach a voltage at which breakdown occurs is not more than 80 ns.

3. A gas laser apparatus emitting ultraviolet radiation according to claim 2, wherein the voltage at which breakdown occurs between said pair of laser discharge electrodes is from 18 to 28 kV and said rise time of the voltage is not less than 40 ns.

* * * * *